March 19, 1957     H. C. ROHR     2,786,175
WINDSHIELD WIPER MECHANISM AND MOTOR CONTROL
Filed Oct. 21, 1953     2 Sheets-Sheet 1
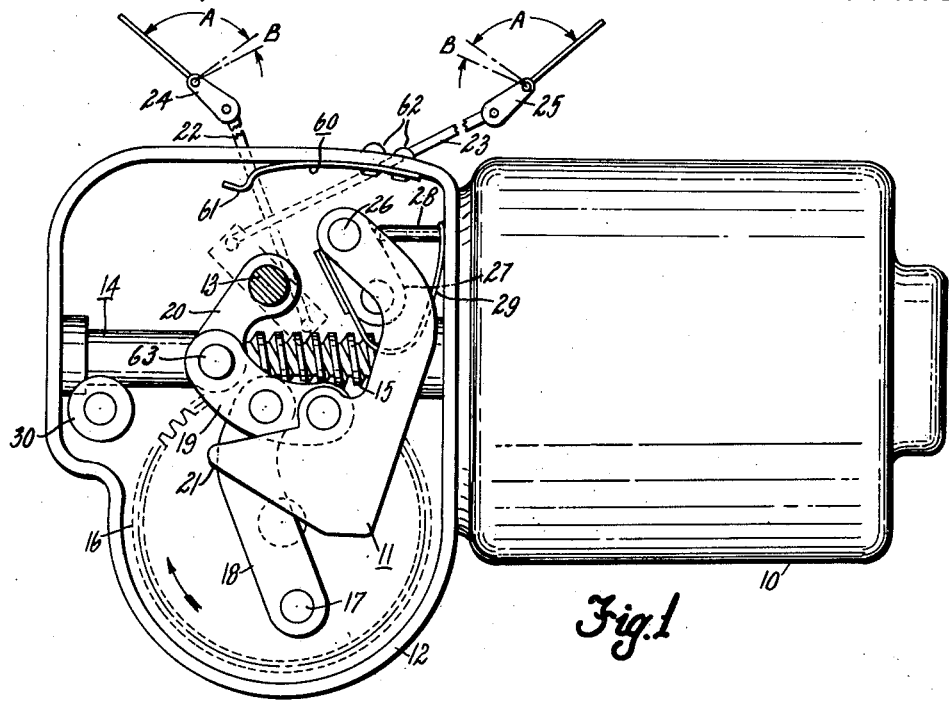
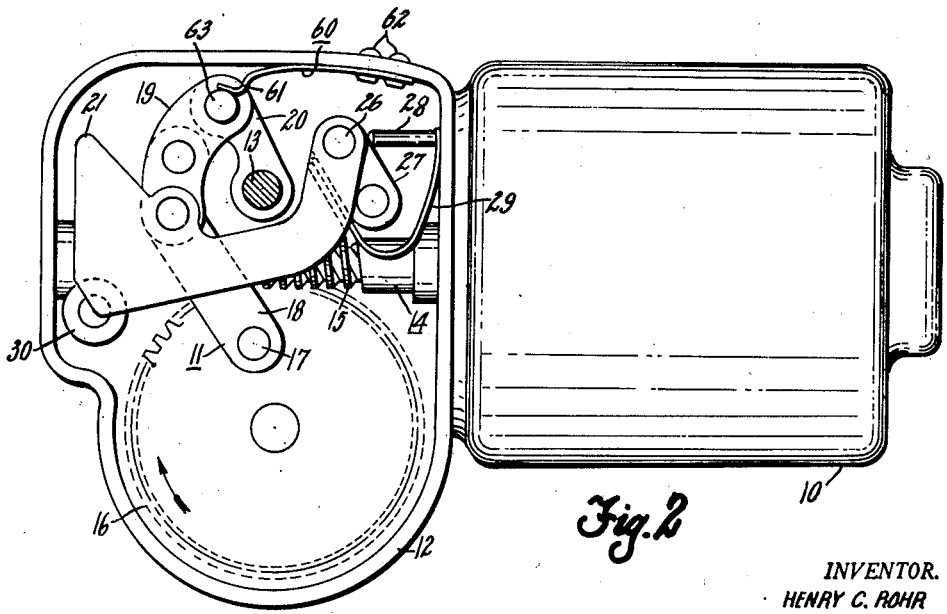
INVENTOR.
HENRY C. ROHR
BY
*George H. Strickland*
HIS ATTORNEY March 19, 1957 H. C. ROHR 2,786,175
WINDSHIELD WIPER MECHANISM AND MOTOR CONTROL
Filed Oct. 21, 1953 2 Sheets-Sheet 2

INVENTOR.
HENRY C. ROHR
BY George H. Strickland
HIS ATTORNEY

United States Patent Office 2,786,175
Patented Mar. 19, 1957

2,786,175

WINDSHIELD WIPER MECHANISM AND MOTOR CONTROL

Henry C. Rohr, Rochester, N. Y., assignor to General Motors Corporation, Detroit, Mich., a corporation of Delaware Application October 21, 1953, Serial No. 387,473

14 Claims. (Cl. 318—466)

This invention pertains to power driven windshield wipers, and particularly to control means for an electric motor driven windshield wiper actuating mechanism.

It has been decided that electric motor operated windshield wiper actuating mechanisms must incorporate means to park the wiper blades beyond their normal wiping strokes. Moreover, although numerous means have been devised to achieve this result, the use of motor inertia, or coasting motor speed, appears to be the most feasible and economical. However, the factor of a variable coefficient of friction between the windshield surface and the wiper blades presents a formidable problem. Thus, the friction resistance opposing movement of the blades on a wet windshield is low in comparison to the frictional resistance present when the windshield is "tacky" (the condition of a windshield just prior to drying). Accordingly, among my objects are the provision of means to compensate for the variable coefficient of friction between a windshield and a wiper blade parked by motor inertia; the further provision of an actuating mechanism including means for introducing an artificial load immediately prior to parking the wiper blades; and the still further provision of means to prevent over-travel of wiper blades parked by motor inertia.

The aforementioned and other objects are accomplished in the present invention by providing resilient means, which are arranged to be stressed by a moving element when it is desired to park the wiper blades. Specifically, this invention relates to means for improving the operation of the mechanism disclosed and claimed in copending application, Serial No. 347,106, filed April 6, 1953, in the name of William K. Schnepf, now Patent No. 2,732,523, wherein an electromagnetic device responsive to motor load is employed to modify the actuation of a parking switch. In the aforementioned application, it is pointed out, that since motor current is proportional to motor load, if the opening of the parking switch is modified by current responsive means, such as the electromagnetic device previously alluded to, motor inertia can be controlled so as to properly park the wiper blades. However, it has been discovered that, while the electromagnetic device of the aforementioned application results in an apparatus which is vastly superior to prior inertia parking mechanisms, it is not entirely effective when the load is low, such as when the windshield is wet.

This invention contemplates the utilization of a leaf spring having a "hump" adjacent the free end thereof. The spring is arranged to cooperate with and operatively engage a pin carried by the arm of the oscillatable driven shaft in the motion converting mechanism. Accordingly, when the mechanism is adjusted to move the wiper blades into the parked position, the pin engages the spring, which imposes an artificial load on the electric motor that effectively times the electromagnetic device to delay movement of the parking switch to the open position, so that the motor always has sufficient inertia to park the wiper blades, irrespective of the windshield variables, such as the coefficient of friction between the blades and the windshield and the blade pressure. Moreover, the spring is effective to latch the pin in the parked position so as to prevent over-travel of the wiper blades.

Further objects and advantages of the present invention will be apparent from the following description, reference being had to the accompanying drawings wherein a preferred embodiment of the present invention is clearly shown.

In the drawings:

Fig. 1 is a view in elevation of windshield wiper actuating mechanism incorporating the compensating means of this invention, with the several parts of the mechanical movement at one end of the wiping stroke.

Fig. 2 is a view similar to Fig. 1 with the several parts of the mechanical movement at the other end of the wiping stroke.

Figure 3:
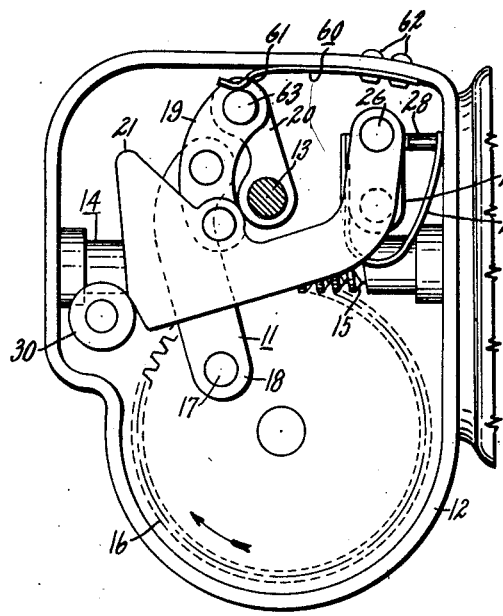
Fig. 3 is a fragmentary view similar to Fig. 1 with the several parts of the mechanical movement shown in the position they assume when the mechanism is adjusted and going into the parked position.

With particular reference to Fig. 1, windshield wiper actuating mechanism is shown including an electric motor 10 and motion converting mechanism 11, or the mechanical movement, which is disposed in a housing 12 and which is adapted to impart oscillation to a driven shaft 13 upon rotation of the motor driven shaft 14. The mechanical movement, or motion converting mechanism 11, does not form any part of this invention, except as hereinafter particularly pointed out, and, hence, will not be described in detail. Suffice it here to say that the mechanical movement is similar to the apparatus disclosed and claimed in copending application, Serial No. 347,021, filed April 6, 1953, in the name of John B. Dyer et al., which mechanism is driven by a unidirectional motor 10, the shaft of which is formed with a worm portion 15 that engages a worm wheel 16 supported for rotation within the housing 12. The worm wheel 16 carries an eccentric element, or crank pin, 17 to which one end of a connecting rod 18 is pivotally connected. The other end of the connecting rod is pivotally connected to the intermediate portion of an operating link 19, the ends of which are respectively connected to an arm 20 of the oscillatory driven shaft 13 and a guide link, or cam member, 21.

The driven shaft 13 may be connected by links 22 and 23 to a pair of spaced wiper blades 24 and 25, so as to move the wiper blades 24 and 25 across the surface of a windshield, not shown. It is to be understood that the mechanical movement disclosed herein, as well as the connections between the mechanical movements and the wiper blades, are only exemplary and are not to be construed as a limitation. The other end of the guide link 21 carries a movable pivot point 26, which is carried by a link 27 pivoted within the housing 12. The movable pivot point 26 as well as the link 27 are normally urged into engagement with a pin 28 by means of a leaf spring 29. Thus, the spring 29 and the pin 28 cooperate to normally position the link 27, as shown in Figs. 1 and 2, at which time the wiper blades are moved throughout the angle A. The pin 28 is adapted to actuate a parking switch to be described more fully hereinafter. The position of the pivot point 26 of the guide link 21 may be varied, by means to be described, so as to alter the amplitude of oscillation imparted to the driven shaft 13 by the mechanical movement, aforedescribed.

Figure 4:
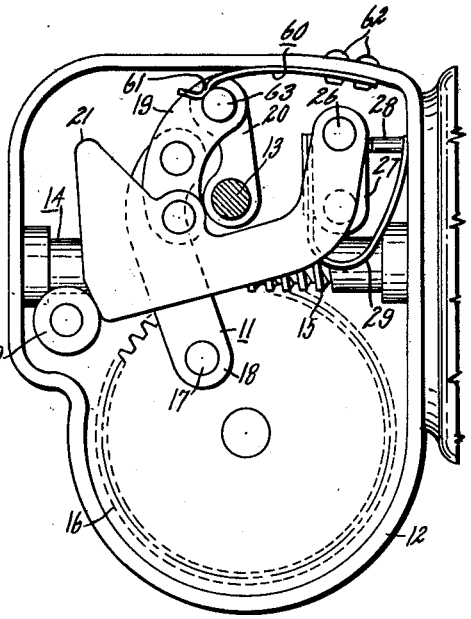
Fig. 4 is a view similar to Fig. 3 with the several parts of the mechanical movement in the parked position.

As is seen in Figs. 1 through 4, a roller 30 is disposed within the housing, which roller is adapted for axial movement in and out of the plane of paper so that upon rotation of the worm gear 16, the end of guide link, or cam member, 21 will be moved into engagement with the roller during its swinging movement, as is shown in Figs. 3 and 4, so as to alter the amplitude of oscillation imparted to the driven shaft 13. The means for effecting axial movement of the roller 30 are more particularly pointed out and disclosed in the aforementioned application, Serial No. 347,021.

Figure 6:
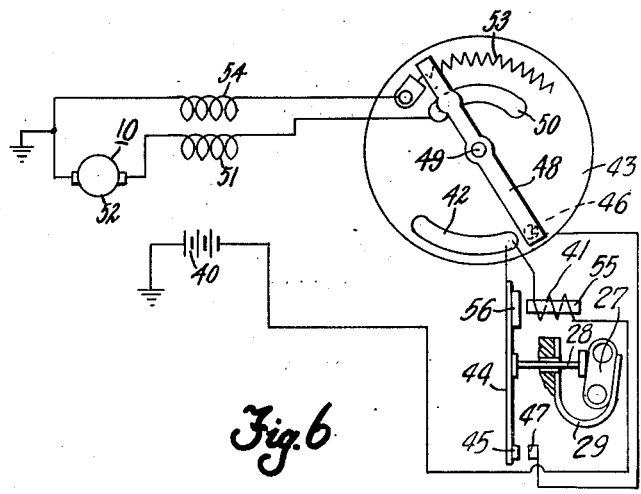
Fig. 6 is a circuit diagram for an electric motor adapted to actuate the windshield wiper mechanism.

With particular reference to Fig. 6, a circuit arrangement for controlling the operation of electric motor 10 will be described. The circuit includes a battery 40, one terminal of which is connected to ground and the other terminal of which is connected through an electromagnetic winding 41, the function of which will be described hereinafter. The electromagnetic winding is, in turn, connected to a bus bar 42 forming a part of the switch assembly, designated generally by the numeral 43. The bus bar is connected by a wire and a resilient contact carrying member 44 to a contact 45, the contact 45 being the movable contact of a parking switch to be described. The switch assembly 43 also includes a terminal 46 connected by a wire with a second contact 47 of the parking switch. The resilient member 44 normally yieldingly maintains contact 45 in engagement with stationary contact 47. A rotary contact member 48 cooperates with the contact 46 and the bus bar 42, the rotary member 48 being adapted for movement about pivot 49. The switch assembly also includes a second bus bar 50, which is connected by a wire through the series field coil 51 of the electric motor 10 and, thence, to one side of the armature 52. The other side of the armature 52, as well as one terminal of the shunt field coil 54 are connected to ground. The other end of the shunt field coil 54 is connected to the end of a variable resistor 53, which is adapted for engagement with the contact member 48 so as to alter the amount of resistance in the shunt field circuit for controlling motor speed. The bridging member 48 also has engagement with the bus bar 50.

Figure 5:
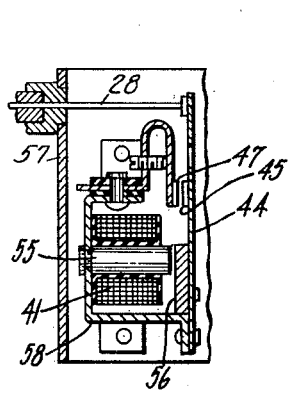
Fig. 5 is a view in elevation indicating the parking switch assembly, or electromagnetic device.

The winding 41, shown schematically in Fig. 6 and structurally in Fig. 5, is wound around a magnetic core 55 and, hence, magnetizes the core whenever current flows through the motor 10. The switch assembly shown in Fig. 5 is constructed according to the disclosure of the aforementioned copending application, Serial No. 347,106, and, per se, forms no part of this invention. The armature 56 of the electromagnet, shown schematically in Fig. 6 and structurally in Fig. 5, cooperates with the magnetic core 55. The armature 56 is carried by the resilient contact carrying member 44, the function of which will be desscribed more fully hereinafter.

With particular reference to Fig. 5, the structural arrangement of the parking switch is shown, which parking switch is carried by a bracket 57, which is mounted within the housing of motor 10. A frame 58 for supporting the electromagnet is suitably attached to the bracket 57. The frame 58 also supports parking switch contact 47. One end of the resilient contact carrying member 44 is riveted, or otherwise suitably attached, to the frame 58, while the armature 56 is rigidly attached to the resilient member 44. The resilient member 44 normally tends to urge contact 45 into engagement with contact 47, which tendency is opposed by spring 29 which engages rod 28. When the link 27 is in the normal running position, as depicted in Figs. 1 and 2, the resilient member 44 will maintain contact 45 in engagement with contact 47, the spring 29 acting through the rod 28 exerting a slight force on the member 44 tending to separate contacts 45 and 47. When the relay 41 is energized, it assists in maintaining contacts 45 and 47 in engagement. The contact carrying member 44 carries parking contact 45 and the free end of the member 44 is provided with a slot through which the actuating pin 28 extends. The actuating pin 28, as will be pointed out hereinafter, is only operable to separate contacts 45 and 47 when the mechanical movement is adjusted to move the wiper blades into the parked position.

As is seen in Figs. 1 through 4, a leaf spring 60 having a hump 61 adjacent its free end is supported by rivets 62 within the housing 12. The hump 61 of the leaf spring is adapted to cooperate with a pivot point pin 63, which interconnects the arm 20 and the operating link 19, only when the mechanical movement is adjusted to move the wiper blades into the parked position. Thus, as is shown in Figs. 1 and 2, during operation of the mechanism so as to move the wiper blades throughout their wiping strokes, designated by the angle A in Fig. 1, the pin 63 does not come into operative engagement with the hump 61 of the leaf spring. However, when the roller 30 is moved axially so as to engage the cam surface of guide link 21, the amplitude of oscillation imparted to the wiper blades is automatically increased to the angle $A+B$, at which time, the pin 63 will be moved into engagement with the hump 61 of the spring 60 and latch therebehind, as is shown in Fig. 4. When the pin 63 engages the hump 61 of the spring 60, an artificial load is imposed upon the motor 10, which load is reflected in the current flow through electromagnetic winding 41. Moreover, after the pin 63 passes the hump 61 and assumes the position shown in Fig. 4, the mechanical movement is effectively "latched" in the parked position, which prevents undesirable over-travel of the wiper blades 24 and 25.

*Operation*

The operation of the control means heretofore described is as follows. When the wiper blades are being moved throughout the angle A by the mechanical movement, the pin 63 does not engage the spring 60, or more particularly the hump 61 thereof, in which case, no "artificial" load is imposed upon the motor. At this time, the bridging member 48 will be in a position interconnecting bus bars 42 and 50 and inserting any predetermined amount of resistance 53 in series with shunt field winding 54 so as to obtain the desired operating speed. Moreover, the link 27 will remain stationary in the position shown in Figs. 1 and 2 as determined by the pin 28 and the spring 29 since at this time, the resilient member 44 urges the pin 28 to the right, as viewed in Fig. 6, thereby engaging contact 45 with contact 47. Further assuming that the windshield is thoroughly wet and the operator desires to park the wiper blades, the following events will ensue. As the friction between the wiper blades and a wet wind-shield is rather low, only a little motor inertia is required to move the blades 24 and 25 throughout the angle B to a parked position, preferably against a cowl of the motor vehicle, not shown. Thus, when the roller 30 is moved axially so as to engage the swinging link 21, and simultaneously therewith the bridging member 48 is moved to the position of Fig. 6, the pin 63 will engage the hump 61 on the spring 60, as is shown in Fig. 3, so as to introduce an artificial load on the motor, which will cause a greater current to flow through electro-magnetic winding 41. At this time, the bridging member 48 is in the position shown in Fig. 6 and the parking switch contacts 45 and 47 will be closed, thereby energizing the motor. When the link 27 is moved from the position of Fig. 2 to the position of Fig. 3 due to displacement of the cam member 21, the rod, or pin, 28 is moved to the right, as shown in Figs. 3 and 5. The parking switch assembly is shown structurally in Fig. 5 from which it may be seen that the rod 28 in moving to the right tends to deflect the outer end of the resilient member 44 to the right. However, the electro-magnetic winding 41 is energized in proportion to the amount of current flowing through the motor and, thus, the core 55 attracts the armature 56 and maintains contact 45 in engagement with contact 47 in opposition to movement of the rod 28. However, the rod 28 will eventually move sufficiently far to separate contacts 45 and 47 to deenergize the motor, the arrangement being such that the contacts 45 and 47 are not separated until the motor has sufficient inertia to move the blades to the parked position, which is depicted by the arm 20 in Fig. 4. Moreover, the hump 61 latches the link 20 in the parked position so as to prevent overtravel of the wiper blades.

Irrespective of the surface condition of the windshield, and other windshield variables, such as blade pressure, it has been found that the combination of the electromagnetic device and the leaf spring 60 results in an arrangement wherein the wiper blades 24 and 25 can be properly parked at all times. The time delay in opening the switch contacts 45 and 47 imposed by the electromagnetic winding 41 is determined by two factors, one of which is constant and the other of which is variable. The constant factor is the artificial load imposed by spring 60, and the variable factor is the frictional resistance between the wiper blades and the windshield surface.

It is apparent from the aforegoing description that the present invention provides an arrangement wherein windshield wiper blades may be parked in the same position by the simple operation of a switch. Moreover, the mechanism disclosed herein may be employed in conjunction with any type of actuating mechanism wherein motor inertia, or coasting motor speed, is employed to move the wiper blades to the parked position.

While the embodiment of the present invention as herein disclosed, constitutes a preferred form, it is to be understood that other forms might be adopted.

What is claimed is as follows:

1. In control means of the character described, an electric motor operatively connected to and driving a member which imposes a variable load thereon, a circuit arrangement for controlling the energization of said motor including switch means for deenergizing said motor at a first predetermined position of said member, an electromagnetic device responsive to motor current for modifying the operation of said switch means, and means for imposing an artificial load on said motor so as to modify the energization of said electromagnetic device whereby irrespective of the variable load imposed on said motor by said member, the said motor will always have sufficient motor inertia after deenergization to move said member to a second predetermined position.

2. A parking control for electric windshield wipers comprising, a motor controlling switch, a resilient actuator therefor normally, yieldingly maintaining said switch closed, a member capable of movement by rotation of said motor and disposed to engage and displace said actuator so as to open said switch at a predetermined point of motor rotation, an electromagnet which when energized, is operable to hold said switch in its closed position and to delay the displacement of said actuator and the opening of said switch by said member for a variable length of time, said electromagnet being connected in circuit with said motor so as to be responsive to motor current, and means for imposing an artificial load on said motor at said predetermined point of motor rotation so as to modify the energization of said electromagnet.

3. In an electric windshield wiper of the class described wherein wiper blades are operatively connected to and driven by an actuating member, the combination of, an electric motor for driving said actuating member, means determining the normal range of movement of said member, a manual switch for controlling the energization of said motor, automatic switch means effective in a first predetermined position of said member to permit deenergization of said motor by opening said manual switch, means to modify the operation of said automatic switch means in accordance with the load imposed on said member, and means to latch said member in a second predetermined position after motor deenergization.

4. In an electric windshield wiper of the class described wherein wiper blades are operatively connected to and driven by an actuating member, the combination of, an electric motor for driving said actuating member, means determining the normal range of movement of said member, a manual switch for controlling the energization of said motor, automatic switch means effective in a first predetermined position of said member to permit deenergization of said motor by opening said manual switch, means to modify the operation of said automatic switch means in accordance with the load imposed on said member, said last recited means comprising an electromagnetic device operatively associated with said automatic switch means for delaying the opening thereof in proportion to the total motor current, and means for introducing an artificial load on said motor at said first predetermined position of said member so as to modify the operation of said electromagnetic device, whereby said motor always has sufficient inertia after deenergization to move the said member to a second predetermined position.

5. Motor control means of the character described comprising, an electric motor operatively connected to and driving a member subject to a variable load, a circuit arrangement for controlling the energization of said motor including a manual switch and automatic switch means effective in a first predetermined position of said member to permit deenergization of said motor upon opening of said manual switch, an electromagnetic device responsive to motor current and operable to modify the operation of said automatic switch means, and means for imposing an artificial load on said motor so as to modify the energization of said electromagnetic device so that irrespective of the variable load imposed upon said motor by said member, said motor will always have sufficient inertia after deenergization to move the said member to a second predetermined position.

6. The combination set forth in claim 5 wherein said last recited means comprise a spring which is engageable by said member when it is in said first predetermined position for imposing a load upon said member and motor so as to vary the energization of said electromagnetic device.

7. The comibnation set forth in claim 6 wherein said spring is formed with a hump engageable by said member for retaining said member in said second predetermined after it is moved by motor inertia.

8. A parking control for an electric windshield wiper comprising, an electric motor for operating said windshield wiper, a motor controlling switch, means operatively associated with said switch and with said wiper to open said switch at a first predetermined position of said wiper, an electromagnetic device cooperable with said switch and responsive to total motor current for modifying the opening of said switch, and means to introduce artificial load on said motor so as to vary the total motor current to which said electromagnetic device is responsive.

9. An electric winshield wiper of the class described including, a wiper driving member, an electric motor for driving said wiper driving member, means determining the normal range of movement of said wiper driving member and means capable of moving said wiper driving member beyond its normal range of movement, the combination comprising, a manual switch for controlling the energization of said motor, automatic switch means effective in a first predetermined position of said wiper driving member to permit deenergization of said motor by the opening of said manual switch, an electromagnetic device responsive to total motor current for modifying the operation of said automatic switch means, and means to impose an artificial load on said motor so as to vary the energization of said electromagnetic device whereby said motor will always have sufficient inertia after deenergization to move said wiper driving member to a second predetermined parked position beyond said normal range of movement.

10. The combination set forth in claim 9 wherein said last recited means comprises a spring.

11. The combination set forth in claim 9 wherein said last recited means comprises a spring having a hump formed thereon which is operable to latch said wiper in said second predetermined parked position.

12. In control means of the character described, an electric motor operatively connected to and driving a member which imposes a variable load thereon, a circuit arrangement for controlling the energization of said motor including switch means for deenergizing said motor, an element operatively connected with said member and said switch means and operable to open said switch means when said member arrives at a first predetermined position, an electromagnetic device responsive to motor current for modifying the operation of said switch means, and means for imposing an artificial load on said motor so as to modify the energization of said electromagnetic device whereby irrespective of the variable load imposed on said motor by said member, the said motor will always have sufficient inertia after deenergization to move said member to a second predetermined position.

13. In an electric windshield wiper of the class described wherein wiper blades are operatively connected to and driven by an actuating member, the combination of, an electric motor for driving said actuating member, means determining the normal range of movement of said member, a manual switch for controlling the energization of said motor, automatic switch means effective in a first predetermined position of said member to permit deenergization of said motor when said manual switch is open, said motor having sufficient inertia after deenergization to move said member to a second predetermined position beyond the normal range of movement, and means to latch said member in said second predetermined position.

14. An electric windshield wiper of the class described including, a wiper driving member, motion converting mechanism operatively connected between said motor and said wiper driving member for imparting oscillation to said wiper driving member throughout a normal stroke, means to adjust said motion converting mechanism so as to increase the stroke of said wiper driving member, an element operatively connected to said motion converting mechanism and displaced upon adjustment of said motion converting mechanism when said wiper driving member reaches a first predetermined position, a manual switch for controlling energization of said motor, automatic switch means for controlling energization of said motor when said manual switch is open, means interconnecting said element and said automatic switch means and operable to open said automatic switch means when said wiper driving member reaches said first predetermined position, an electromagnetic device responsive to total motor current for modifying the operation of said automatic switch means, and means to impose an artificial load on said motor so as to vary the energization of said electromagnetic device whereby said motor will always have sufficient inertia after deenergization to move said wiper driving member to a second predetermined position beyond the normal stroke thereof.

No references cited.